(12) United States Patent
Abhyanker et al.

(10) Patent No.: US 9,261,396 B2
(45) Date of Patent: Feb. 16, 2016

(54) SYSTEM AND METHOD FOR MONITORING LIQUID LEVEL IN CONTAINERS/RESERVOIRS

(75) Inventors: Ranjit Abhyanker, Karnataka (IN); B M Dharshan, Karnataka (IN); Shah Mihir Paresh, Maharashtra (IN)

(73) Assignee: Excelfore Corporation, Fremont, CA (US)

( * ) Notice: Subject to any disclaimer, the term of this patent is extended or adjusted under 35 U.S.C. 154(b) by 806 days.

(21) Appl. No.: 13/335,410

(22) Filed: Dec. 22, 2011

(65) Prior Publication Data
US 2012/0253706 A1 Oct. 4, 2012

(30) Foreign Application Priority Data

Mar. 31, 2011 (IN) ............................ 1081/CHE/2011

(51) Int. Cl.
*G01F 23/00* (2006.01)
*G01F 25/00* (2006.01)
*G01F 23/26* (2006.01)
*G01F 23/28* (2006.01)

(52) U.S. Cl.
CPC ........ *G01F 23/0061* (2013.01); *G01F 23/0076* (2013.01); *G01F 23/26* (2013.01); *G01F 23/28* (2013.01); *G01F 25/0061* (2013.01)

(58) Field of Classification Search
USPC ......................................................... 702/55
See application file for complete search history.

(56) References Cited

U.S. PATENT DOCUMENTS

| 2003/0136173 | A1* | 7/2003 | Elenich | G01F 9/001 73/1.73 |
| 2004/0073386 | A1* | 4/2004 | Benedetti | G01F 23/0076 702/55 |
| 2007/0079804 | A1* | 4/2007 | Nakayama | B60R 25/1004 123/339.15 |
| 2008/0295569 | A1* | 12/2008 | Lundstrom | G01F 23/32 73/1.73 |
| 2011/0010070 | A1* | 1/2011 | Bohr | G01F 23/0076 701/102 |
| 2011/0140877 | A1* | 6/2011 | Gilchrist | B60K 15/04 340/450.2 |

FOREIGN PATENT DOCUMENTS

FR WO 0057144 A1 * 9/2000 ........... G01F 23/0076

* cited by examiner

*Primary Examiner* — Sujoy Kundu
*Assistant Examiner* — Steven J Malone
(74) *Attorney, Agent, or Firm* — Brinks Gilson & Lione (57) ABSTRACT

A system for monitoring level of a liquid in a reservoir of a machine is provided. The system includes a liquid sensor (112) that measures said level of said liquid in said reservoir, a fixed voltage feed (110) that generates a regulated voltage, a sampling unit (114) that samples one or more parameters of the machine and a calibration unit (124) that calibrates the system for monitoring the level of said liquid in a reservoir of a machine in one or more modes to obtain a mathematical relation between the parameter and the level of the liquid. The calibration unit executes a calibration process during a first mode and obtains a calibrated data that corresponds to the parameter during a second mode.

20 Claims, 11 Drawing Sheets

SYSTEM AND METHOD FOR MONITORING LIQUID LEVEL IN CONTAINERS/RESERVOIRS

BACKGROUND

1. Technical Field

The present invention relates to liquid level monitoring systems and more particularly to calibrating and/or monitoring a liquid level in containers or reservoirs.

2. Description of the Related Art

Liquid consumption especially fuel in containers/reservoirs (e.g. fuel tank of vehicles, static fuel tanks of cell phone towers and generators) needs to be monitored to measure efficiency of fuel consumption and control fuel pilferage. Since the containers or reservoirs inherently involve large fuel transactions (e.g., consumption and delivery), it is necessary to monitor an amount of fuel being received and consumed on an ongoing basis. Containers or reservoirs differ in size in vehicles, static fuel tanks of cell phone towers. Thus, human intervention may results in errors and is less reliable over accurate remotely monitoring methods. Manual calibration of liquid level and handling of potentially hazardous and corrosive liquids in such containers is very cumbersome.

Containers of different shape/size will have to be calibrated individually for measuring the liquid level. Typically, fuel level sensors are used for monitoring level of liquid within a tank and are resistive, capacitive, ultrasonic or electromagnetic in nature. Previously attempts have been made to monitor liquid level by measuring and calibrating sensor voltage/current versus liquid capacity by incrementally filling the container or reservoir. However, this process is very cumbersome and time consuming as the reservoir needs to be emptied first, and then filled in an incremental manner while measuring the sensor voltage at each level of filling the liquid. This process is impractical for large tanks in remote areas and may involve risk when the liquid being handled is volatile/inflammable/corrosive in nature.

In another implementation, a pre-calibrated sensor is installed in a liquid tank. This is only suitable for environments where the tank geometry and the sensor type are known upfront and tank geometry along with sensor voltage is constant at every specific level. However, this approach is unsuitable for after market applications as the size and shape of the tanks vary from one to the other. Irrespective of whether the liquid is being consumed or being refilled, at any given moment, it is important to accurately estimate a quantity of liquid in a tank/container. As discussed, a liquid monitoring sensor needs to be installed to accurately calibrate for a signal from the sensor to correspond to an actual amount of liquid which is present at any given time in the tank.

If information regarding the present quantity of liquid in the tank can be obtained from the sensor, a control unit, for example, may be used to indicate a maximum possible distance for an automotive vehicle to travel before the tank has to be refilled or to calculate efficiency of system having a static liquid container. To perform such calculations the accuracy of the information on liquid (e.g., fuel) volume present in the tank/container is critical. As mentioned above, currently tanks are equipped with a liquid level sensor which is adapted for measuring and monitoring the level of liquid surface.

These types of sensors do not take into account the fact that the tank may have a varying cross-section (along any dimension). As a result of a non-uniform and irregular shape and size, it is difficult to obtain an accurate reading of the liquid level. Conventional sensors fail to measure fuel levels when the ignition is turned OFF, since there is no voltage from the battery to the sensor. Accordingly, there remains a need for a calibration system and method that determines liquid level irrespective of the size and shape of the containers/reservoirs, and at all times.

SUMMARY

In view of the foregoing, an embodiment herein provides a liquid level monitoring system and method for monitoring liquid levels in containers/reservoirs of machines and vehicles.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In one aspect, a system for monitoring level of a liquid in a reservoir of a machine is provided. The system includes a liquid sensor that measures the level of the liquid in the reservoir, a fixed voltage feed that generates a regulated voltage, a sampling unit that samples one or more parameters of the machine and a calibration unit that calibrates the system for monitoring the level of the liquid in a reservoir of a machine in one or more mode to obtain a mathematical relation between the parameter and the level of the liquid. The calibration unit executes a calibration process during a first mode and obtains a calibrated data that corresponds to the parameter during a second mode. The system further includes an averaging logic unit that stores the parameters of the machine and a relay unit coupled to the liquid sensor. The relay unit powers the liquid sensor when the machine is in an OFF condition.

The system further includes a parameter storage unit that stores the parameters of the machine. The system further includes a communication unit that communicates the parameters to a local or remote server. The parameters of the system include one or more of a fuel sensor voltage, a fuel sensor current, a fuel sensor positioning, a battery voltage, a plurality of ignition timings or a plurality of an odometer reading. The sampling unit performs sampling of the parameters over a predetermined programmable period of time.

In another aspect, a system for monitoring a level of liquid in a reservoir of a machine is provided. The system includes a liquid sensor that measures the level of the liquid in the reservoir, a relay unit coupled to the liquid sensor. The relay unit powers the liquid sensor when said machine is in OFF condition. A fixed voltage feed is coupled to the relay circuit. The fixed voltage feed generates a regulated voltage for the relay circuit. The sampling unit samples one or more parameters of the machine. The system further includes a parameter storage unit that stores the parameters of the machine, an averaging logic unit that averages the parameters of the machine and a communication unit that communicates the parameters to a local or remote server. The system further includes a calibration unit that calibrates the system for monitoring the level of the liquid in a reservoir of a machine in one or more mode to obtain a mathematical relation between the parameters and the level of the liquid. The calibration unit executes a calibration process during a first mode and obtains a calibrated data that corresponds to the parameter during a second mode.

In yet another aspect, a method of calibrating a liquid level monitoring system for measuring liquid levels in a reservoir of a machine in one or more modes is provided. The method includes acquiring a data that includes one or more of an averaged parameter, converting the data into a first characteristic representation, acquiring a liquid injection rate in the reservoir in the mode, converting the first characteristic representation into a second representation based on the liquid injection rate and deriving one or more optimised mathematical representations for the second representation. The liquid level monitoring system is calibrated based on the optimised mathematical representations. The mode is a liquid refilling mode. The first characteristic representation is a voltage versus time plot and the second representation is voltage versus fuel plot. The method further includes partitioning at last a portion of said second representation into one or more sections and deriving one or more optimised mathematical representation for each of the sections. The liquid level monitoring system is calibrated based on the optimised mathematical representation.

In yet another aspect, a method of calibrating a liquid level monitoring system for measuring liquid levels in a reservoir of a machine in one or more modes is provided. The method includes acquiring a data including one or more of averaged parameter, converting the data into a first characteristic representation, acquiring a liquid consumption rate in the reservoir in the mode, converting the first characteristic representation into a second characteristic representation based on the liquid consumption rate and deriving one or more optimised mathematical representation for the second representation. The liquid level monitoring system is calibrated based on the optimised mathematical representation. The first characteristic representation is a voltage versus distance plot and the second representation is voltage versus fuel plot. The method further includes partitioning at last a portion of said second representation into one or more sections and deriving one or more optimised mathematical representation for each of the sections. The liquid level monitoring system is calibrated based on the optimised mathematical representation.

In yet another aspect, a method of calibrating a liquid level monitoring system for measuring liquid levels in a reservoir is provided. The method includes acquiring a first data that includes one or more of an averaged parameter, acquiring a second data that includes one or more of an averaged parameter, converting the first data into a first characteristic representation, converting the second data into a second characteristic representation, acquiring a liquid injection rate in the reservoir, converting the first characteristic representation into a third representation based on the liquid injection rate; acquiring liquid consumption rate by the reservoir, converting the second characteristic representation into a fourth representation based on the liquid consumption, combining the third representation and the fourth representation to obtain a combined representation, deriving one or more optimised mathematical representation for the combined representation. The liquid level monitoring system is calibrated based on the optimised mathematical representation.

The first characteristic representation is a voltage versus time plot and the second characteristic representation is a voltage versus fuel plot. The liquid consumption rate is liquid consumption per unit of distance covered. The method further includes combining an inversion of the third representation and an inversion of the fourth representation to obtain the combined representation. The first data is acquired in a refilling mode and the second data is acquired in a liquid consumption mode. The averaged parameters include any of a fuel sensor voltage, a fuel sensor current, a fuel sensor positioning, a battery voltage, one or more ignition timings or one or more odometer readings.

The method further includes partitioning one or more portion of the combined representation into one or more sections and deriving one or more optimised mathematical representation for each of the sections. The liquid level monitoring system is calibrated based on the optimised mathematical representation. The third representation is a first voltage versus fuel plot and the fourth representation is a second voltage versus fuel plot.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new system and method that determines liquid level irrespective of the size and shape of the containers/reservoirs at all times. The embodiments herein achieve this by providing a system and method for monitoring liquid level in containers/reservoirs with auto-calibration technique. Referring now to the drawings, and more particularly to FIGS. 1 through 7B, where similar reference characters denote corresponding features consistently throughout the figures, there are shown preferred embodiments.

Figure 1:
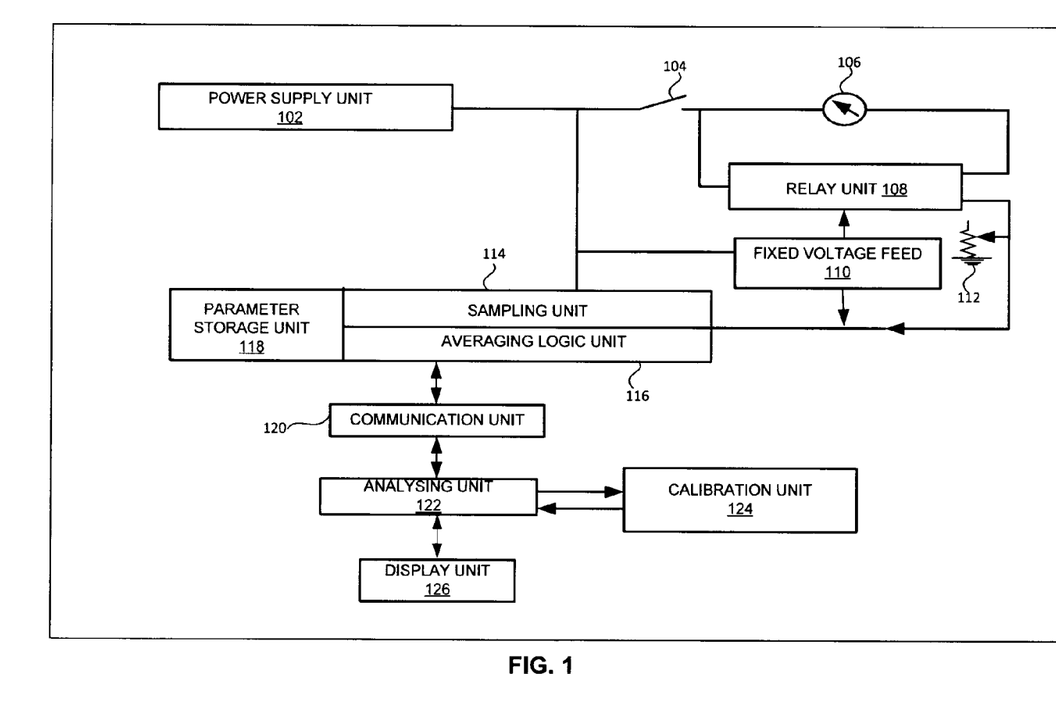
FIG. 1 illustrates a schematic diagram of a liquid level monitoring system according to an embodiment herein.

FIG. 1 illustrates a schematic diagram of a liquid level monitoring system 100 according to an embodiment herein. The liquid level monitoring system 100 includes a power supply unit 102, an ignition key 104, a fuel gauge 106, a relay circuit 108, a fixed voltage feed 110, a fuel sensor 112, a sampling unit 114, an averaging logic unit 116, a parameter storage unit 118, a communication unit 120, an analysing unit 122, a calibration unit 124, and a display unit 126.

The power supply unit 102 is connected to the fuel gauge 106, and the relay circuit 108 via the ignition key 104. In one embodiment, the power supply unit 102 is a battery. In one embodiment, the power supply unit 102 is a vehicle battery. The relay circuit 108 further connects to the fuel gauge 106, the fixed voltage feed 110, and the fuel sensor 112. The fuel gauge 106 is connected to the fuel sensor 112 via the relay circuit 108. The fuel sensor 112 and the power supply unit 102 are connected to the sampling unit 114. The sampling unit 114, the averaging logic unit 116, and the communication unit 120 are directly connected to the parameter storage unit 118.

The communication unit 120 communicates data e.g. parameters, averaged parameters, sampled voltages etc from the sampling unit 114 and the averaging logic unit 116 to a local or remote server that includes the analysing unit 122 that analysis and maps a sampled voltage to a calibrated data and a mathematical model or representation obtained from the calibration unit 124. The analysis and mapping by the analysing unit 122 generates a liquid volume reading corresponding to the sampled voltage which is displayed on the display unit 126.

The liquid level monitoring system 100 obtains information associated with fuel level of vehicle in one or more phases and/or at least one of modes and then models the obtained information into a prediction curve for monitoring the liquid level. In one embodiment, the modes may be a learn mode, and/or run mode. During the learn mode, the liquid level monitoring system 100 is calibrated using the voltage of the fuel sensor 112, a refueling data, and/or a data from the fuel consumption (vehicle parameters like Odometer readings, etc). The calibration is carried out in ignition ON and OFF conditions. During the run mode, voltage measurements of the fuel sensor 112 are mapped to the calibration data obtained in the learning mode and the fuel level is reported for ignition ON and OFF conditions. The battery voltage or the voltage of the power supply unit 102 is taken as a reference voltage for measuring sensor voltage which nullifies any fluctuation in the battery voltage or the voltage of the power supply unit 102.

The sampling unit 114 samples voltage of the fuel sensor 112 and voltage of the power supply unit 102, along with the sampling interval data of the parameter storage unit 118. The sampling interval is pre-defined and may be re-defined as per the requirements. For example, the sampling unit timer may be set for more sampling time interval in learn mode to obtain more data points and the sampling unit timer may be set for lesser sampling timer interval in run mode to enable it for fast analysis and mapping. In one embodiment, the sampling of voltages is carried out using an analog to digital Converter (ADC) Circuit. The sampling unit 114 obtains data (e.g., the sampling time) from the parameter storage unit 118 and samples the data from the fuel sensor 112 when the ignition key 104 is in ON condition. When the ignition key 104 is in OFF condition, the fixed voltage feed 112 powers the fuel sensor 112 and thus allows measurement of sensor position when the ignition is in OFF condition. The sampling unit 114 also compensates for the variation of voltage of the fuel sensor 112 based on the configuration stored in the parameter storage unit 118.

The averaging logic unit 116 averages the sampled fuel sensor voltage and the battery voltage data over a predefined programmable period of time. The averaging logic unit 116 derives the sampling data from the parameter storage unit 118. The parameter storage unit 118 stores machine specific configuration parameters which may be configured and transmitted using the communication unit 120. The machine specific configuration parameters may include data frequency, timer data or a voltage level.

The averaging logic unit 116 allows usage of one or more averaging techniques that are available. The averaging logic unit 116 sends a burst of the averaged data to a server for calibration during the learning mode depending on the sampling time (stored in the parameter storage unit 118). In one embodiment, the averaging logic unit 116 sends the burst of the average data to the server after averaging the voltage data. The communication unit 120 transmits the averaged data and the sampled data to the analysing unit 122, and the calibration unit 124. Post calibration of data and generation of a mathematical representation or model in the calibration unit 124, the sampled voltage are mapped to the mathematical representation in the analysing unit 122. On mapping, the analysing unit generates a volume reading which is displayed on the display unit 126. The mathematical representation or model depicts a mathematical relationship between one or more parameters of the vehicle/machine e.g., a mathematical model or representation depicting a mathematical relationship between a sampled voltage and the liquid level in the reservoir.

Figure 2:
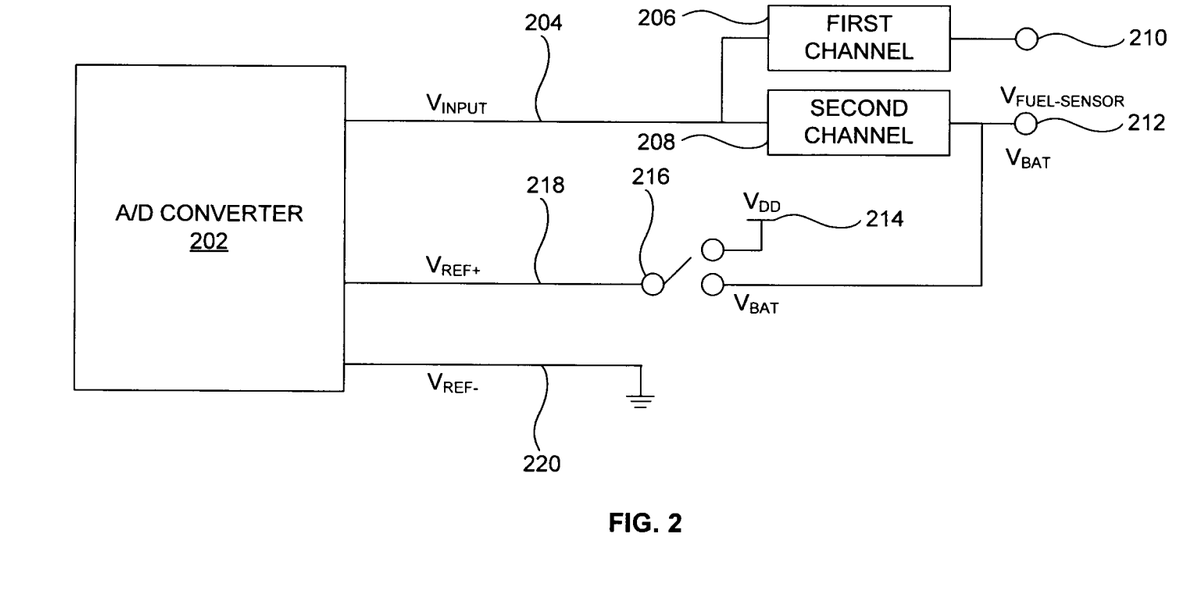
FIG. 2 illustrates an exploded view of a sampling unit, of the liquid level monitoring system of FIG. 1 according to an embodiment herein.

FIG. 2 illustrates an exploded view 200 of the sampling unit 114 of the liquid level monitoring system of FIG. 1 according to an embodiment herein. In one embodiment, the sampling unit 114 is a two channel sampling unit. The sampling unit 114 includes an ADC unit 202, a voltage input 204, a first channel 206, a second channel 208, a fuel sensor voltage input 210, a battery voltage input 212; a fixed voltage feed input 214, a switch 216, a positive reference voltage input 218, and a negative reference voltage input 220.

The voltage input 204 receives fuel sensor voltage 210 through the first channel 206, and the battery voltage input 212 through the second channel 208. The voltage input 204 is converted from analog to digital using A/D converter 202. The positive reference voltage input 218 is switched to the fixed voltage input 214 or the battery voltage input 212 depending on one or more characteristics of vehicle/machine. For example, the fuel sensor voltage 210 is dependent on or independent of changes in battery voltage. The battery voltage input 212 is also converted from analog to digital fixed voltage input 214 as a reference voltage. The negative reference voltage input 220 is connected to ground. The ADC unit 202 measures voltages of the fuel sensor 112 (not shown in the FIG. 2) and the power supply unit 102 (not shown in the FIG. 2).

Figure 3:
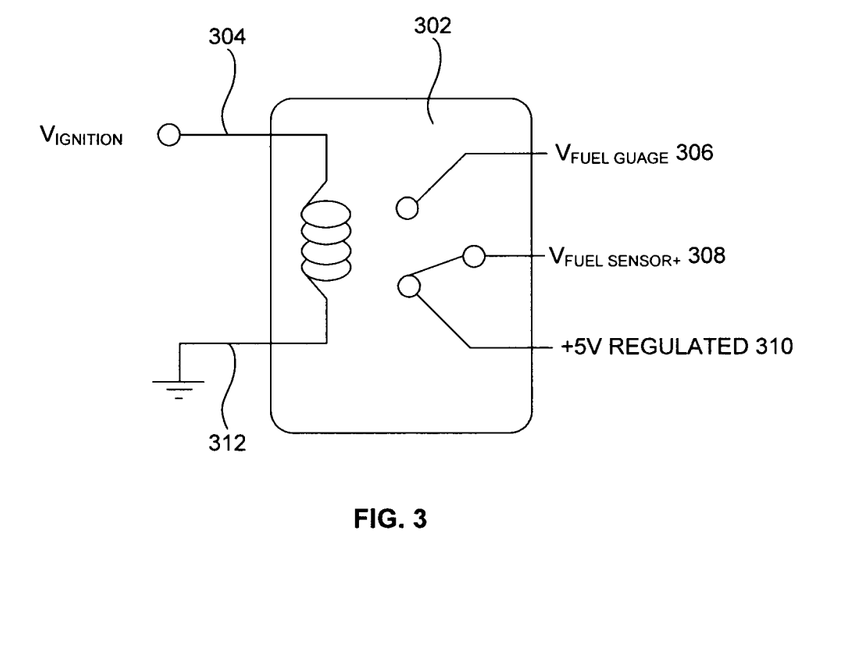
FIG. 3 illustrates an exploded view of a relay circuit of the liquid level monitoring system of FIG. 1 according to an embodiment herein.

FIG. 3 illustrates an exploded view 300 of the relay circuit 108 of the liquid level monitoring system of FIG. 1 according to an embodiment herein. The relay circuit 108 includes a relay unit 302, an ignition switch input 304, a fuel gauge input 306, a fuel sensor output 308, a 5 volt regulated voltage input 310, and a ground 312. The ignition switch input 304 is directed into the relay unit 302. When the ignition is in ON condition, the relay unit 302 connects the fuel gauge input 306 to fuel sensor output 308. When the ignition is in OFF condition, the relay unit 302 connects the 5 volt regulated voltage input 310 to fuel sensor output 308. Thus, the relay circuit 108 powers the fuel sensor 112 when the ignition is in OFF condition.

Figure 4:
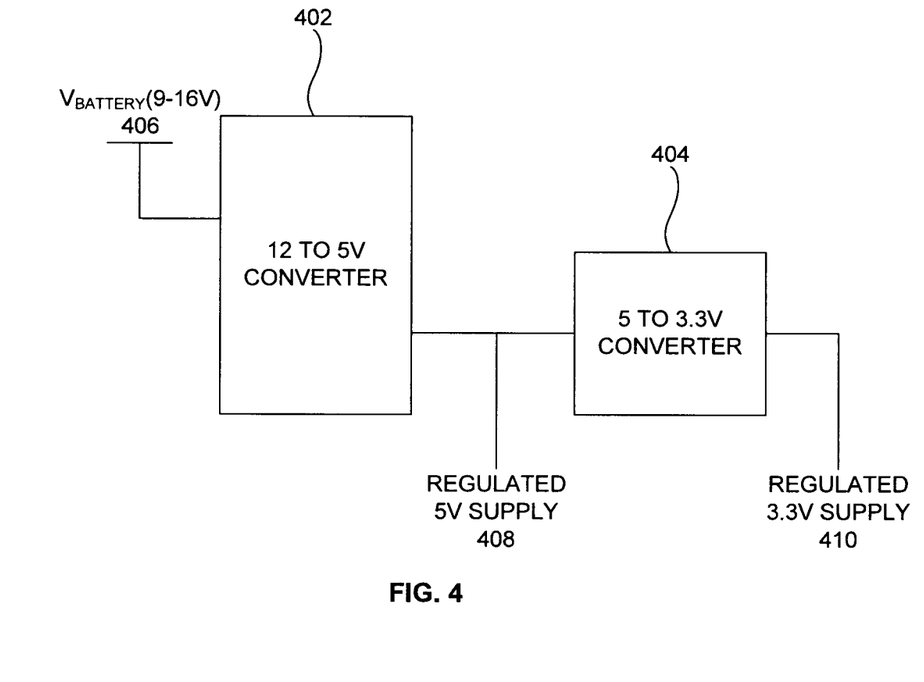
FIG. 4 illustrates an exploded view of a fixed voltage feed of the liquid level monitoring system of FIG. 1 according to an embodiment herein.

FIG. 4 illustrates an exploded view 400 of a fixed voltage feed unit 112 of the liquid level monitoring system 100 of FIG. 1 according to an embodiment herein. The fixed voltage feed unit 112 is one of the implementations for generating fixed voltage feeds. In one embodiment, any circuit that generates fixed voltage feeds may be implemented in the liquid level monitoring system 100 of FIG. 1.

The fixed voltage feed unit 112 includes a 12 Volt to 5 Volt converter 402, a 5 Volt to 3.3 Volt converter 404, a battery voltage input 406, a regulated 5 Volt supply output 408, and a regulated 3.3 Volt supply output 410. The battery voltage input 406 is directly connected to the 12 Volt to 5 Volt converter 402 which gives a regulated 5 Volt supply through the regulated 5 Volt supply output 408. The regulated 5 volt output supply 408 is fed as input to the 5 Volt to 3.3 Volt converter 404 to output a 3.3 Volt regulated supply through the regulated 3.3 volt supply output 410. The fixed voltage feed unit 112 feeds regulated 5 volt supply to the relay unit 302 of FIG. 3 via 5 volt regulated voltage input 310. In addition, the fixed voltage feed unit 112 also powers the sampling unit 124 when the ignition is in OFF condition.

Figure 5A:
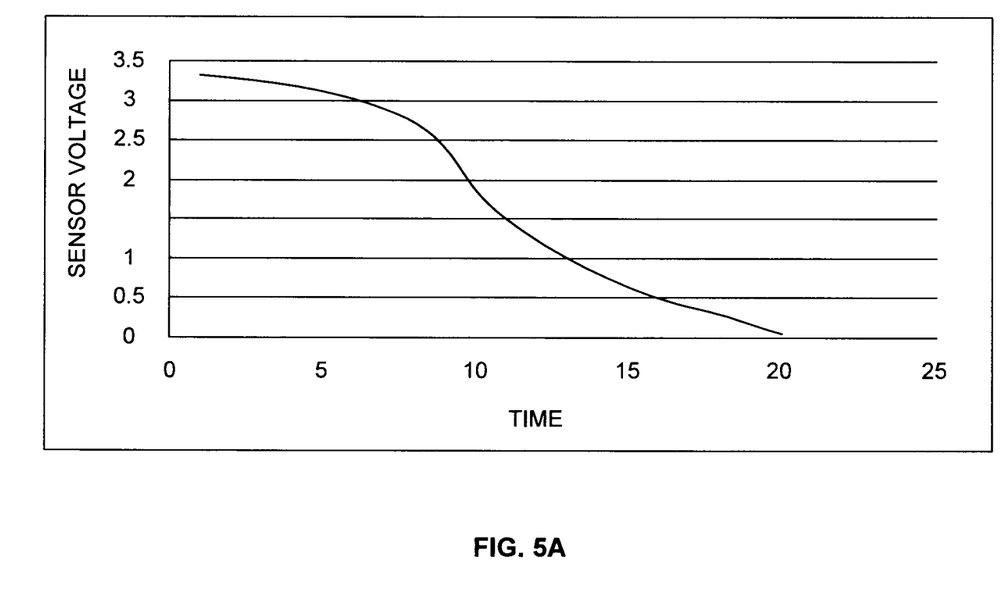
FIG. 5A is a graphical representation illustrating a characteristic curve of sensor voltage versus time during refuel of a tank according to an embodiment herein.

FIG. 5A is a graphical representation illustrating a characteristic curve of sensor voltage versus time during refuel of a tank according to an embodiment herein. The data obtained from the fuel sensor 112 through the fuel gauge 106 or through the fixed voltage feed 112 during refueling is plotted along y axis with respect to time to obtain a typical curve for a vehicle's fuel refueling per units of time. During refueling, rate of fuel pumped into the tank is constant for a fuel hose. Therefore, the sensor voltage varies corresponding to a fuel level in the tank. This determines the voltage of the sensor with respect to a shape of the tank. For example, when the tank is broader at the bottom then the sensor variation will be slow when fuel level is near the bottom of the tank as compared to the variation seen when fuel level is near the top of the tank where cross section of the tank is small.

Figure 5B:
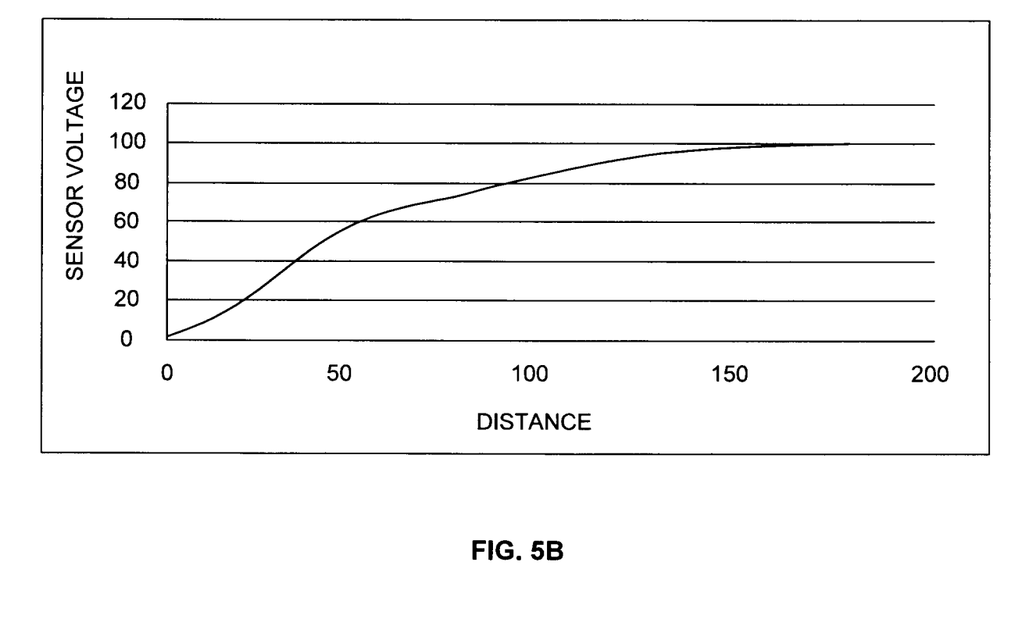
FIG. 5B is a graphical representation illustrating a characteristic curve of sensor voltage versus distance during the fuel consumption according to an embodiment herein.

FIG. 5B is a graphical representation illustrating a characteristic curve of sensor voltage versus distance during the normal run of the vehicle according to an embodiment herein. The data obtained during a normal run is plotted along y axis with respect to one or more of fuel consumption parameters (e.g., odometer readings, ignition on time or reading from a flow meter, etc.) of the vehicle to obtain a typical curve for the vehicle's fuel consumption per unit of distance. In case of generators, earth moving equipment, or stationary engines, the fuel consumption may also be plotted versus the engine ON/Run mode. During the run mode, vehicle mileage is constant over a period of time for a particular vehicle. However, the sensor voltage varies with respect to the shape of the tank.

Figure 6A:
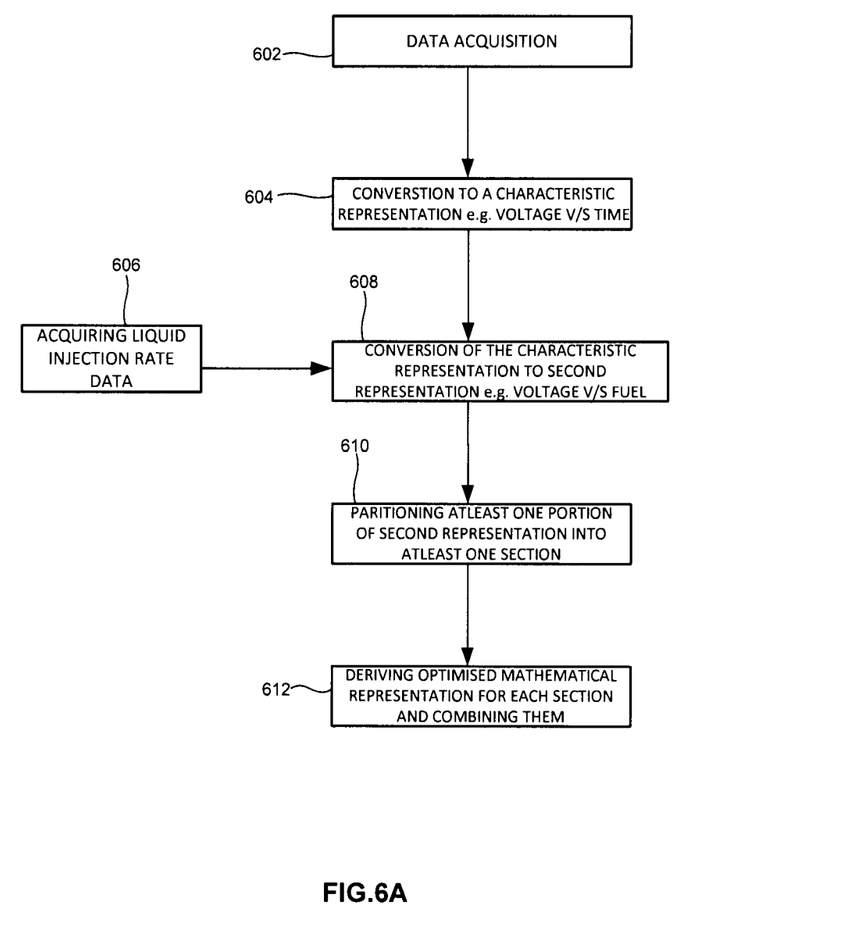
FIG. 6A through 6C is a flow chart illustrating a process of calibrating parameters in one or more modes performed in the calibration unit of the liquid level monitoring system of FIG. 1 according to an embodiment herein.

FIG. 6A is a flow chart illustrating a process of calibrating one or more parameters in a refuel mode performed in the calibration unit 124 of the liquid level monitoring system 100 of FIG. 1 according to an embodiment herein. In one embodiment, the parameters are sampled voltages and averaged voltages obtained from the averaging logic unit 116 and the sampling unit 124 of FIG. 1. In one embodiment, the required parameters are obtained from the fuel sensor 106 and the fuel gauge 112 depending on the ignition status of the vehicle. In step 602, data pertaining to sampled voltages of the fuel gauge 106 and the fuel sensor 112 and sampled interval of times is obtained.

In step 604, the data obtained from the step 602 is converted to a characteristic representation. In one embodiment, the characteristic representation is plot of voltage versus time (as shown in FIG. 5A). In step 606, data pertaining to liquid injection rate is obtained. In one embodiment, liquid injection rate is fuel injection rate in a vehicle. The fuel injection rate is constant for a particular fuel hose pump. Using data obtained in the step 606, a second representation is obtained which is based on the characteristic representation step 608. In one embodiment, in step 608 the fuel injection rate is used to convert voltage versus time plot to voltage versus fuel plot. In one embodiment, the voltage versus fuel plot obtained in the step 608 is inversed to form a plot of fuel versus voltage for further processing. In one embodiment, the step 602 to the step 608 may be repeated for one or more times. In step 610, the curves as obtained in the second representation or its inverse from the step 602 to step 608 are partitioned into one or more of appropriate sections. In one embodiment, the curves of voltage versus fuel plot or fuel versus voltage plot are partitioned in one or more appropriate sections in step 610. In step 612, an optimised mathematical representation of each section of the partitioned representation is obtained and to measure amount of fuel/liquid volume in the vehicle/machine. The optimised mathematical representation may be one or more of a mathematical model, a mathematical equation, a look up table or a graphical representation.

Figure 6B:
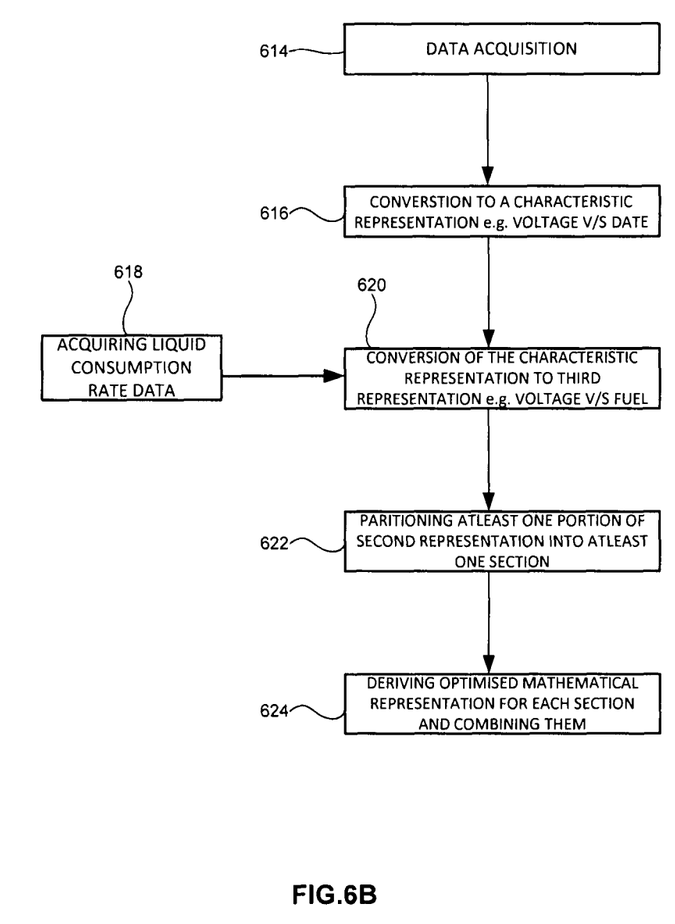

FIG. 6B is a flow chart illustrating a process of calibrating one or more parameters in a fuel consumption mode performed in the calibration unit 124 of the liquid level monitoring system 100 of FIG. 1 according to an embodiment herein. In step 614, data pertaining to liquid level inside the liquid tank is obtained from the liquid sensor 112 or the fuel gauge 106 depending on the ignition status. In one embodiment, the data pertaining to liquid level in a tack is fuel level in a vehicle. In one embodiment, the sensor is electromagnetic, capacitive, ultrasonic etc. The data is obtained at a given time during fuel consumption based on an ignition status of vehicle/machine.

In step 616, the data obtained in the step 614 is converted to obtain a characteristic representation. In one embodiment, the characteristic representation is a characteristic plot of voltage versus distance (as shown in FIG. 5B). A liquid consumption rate data is obtained in step 618. In one embodiment, liquid consumption rate for a vehicle is mileage of the vehicle. The vehicle mileage data is considered to be constant over a period of time for a particular vehicle. Using the vehicle mileage data obtained in the step 618, a third representation is obtained in step 620. In one embodiment, the third representation is a voltage versus fuel plot. In one embodiment, the plot of voltage versus fuel obtained in step 618 is inversed to obtain a plot of fuel versus voltage to carry out further data processing. The step 614-620 may be repeated for one or more times. In step 622, the curves of the third representation or its inverse as obtained through step 614-620 are partitioned into one or more appropriate sections. In one embodiment, curves of voltage versus fuel plot or fuel versus voltage plot are partitioned in one or more appropriate sections. In step 624, an optimised mathematical representation for each of the sections is obtained in order to measure amount of liquid/fuel present in a machine/vehicle.

Figure 6C:
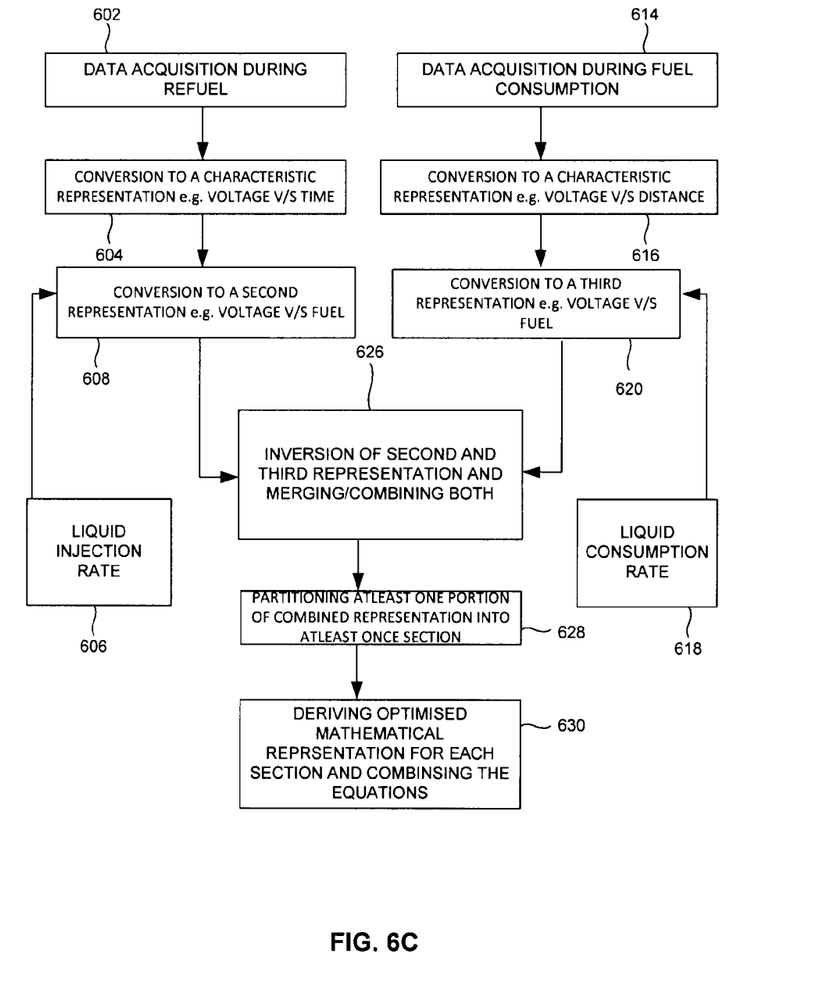

With reference to FIG. 6A and FIG. 6B, FIG. 6C is a flow chart illustrating a process of calibration of one or more parameters by obtaining data from both the refueling mode and the fuel consumption mode according to an embodiment herein. In step 624, the second and third representations as obtained in the step 608 and 620 through process illustrated in flow charts of FIG. 6A and FIG. 6B are merged to obtain a combined representation. In one embodiment, the second and third representations as obtained in step 608 and 620 are inversed and merged thereafter. The whole of the above calibration process illustrated in flow chart of FIG. 6C may be repeated one or more times to obtain refined and accurate readings and plots. The curves of the combined or merged representation are sectioned into appropriate sections in step 628. In step 630, an optimised mathematical representation is obtained for each section and is merged to obtain a final combined vehicle/machine equation to estimate the volume of fuel/liquid in a tank/reservoir of a vehicle/machine.

Figure 7A:
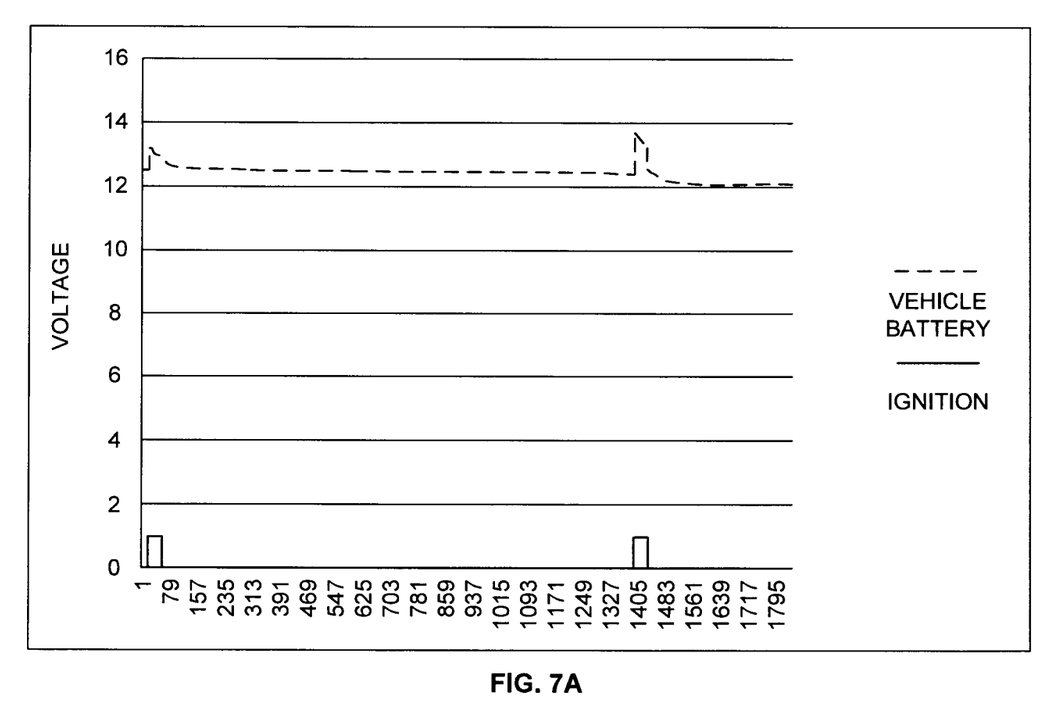
FIG. 7A is a graphical representation illustrating variation of vehicle battery voltage when ignition is switched ON according to an embodiment herein.

FIG. 7A is a graphical representation illustrating variation of vehicle battery voltage when ignition is switched ON according to an embodiment herein. The vehicle battery voltage data are plotted versus variations. The sensor may not always give same reading for a certain liquid level. The reading will vary depending on a plurality of factors such as supply voltage, temperature, etc. In case of a vehicle, a variation in battery voltage causes an inaccurate voltage output for same fuel levels. A vehicle uses either a 12V battery or a 24V battery. The sensor voltage is dependent on the battery voltage. For example, for a same fuel level, when the battery voltage varies, the sensor output may indicate a variation in a reading leading to inaccurate fuel predictions. Therefore, to avoid inaccuracies of such battery voltage variation, the battery voltage is taken as a reference voltage for measuring the sensor voltage which nullifies any deviation caused due to variations of the battery voltage.

Figure 7B:
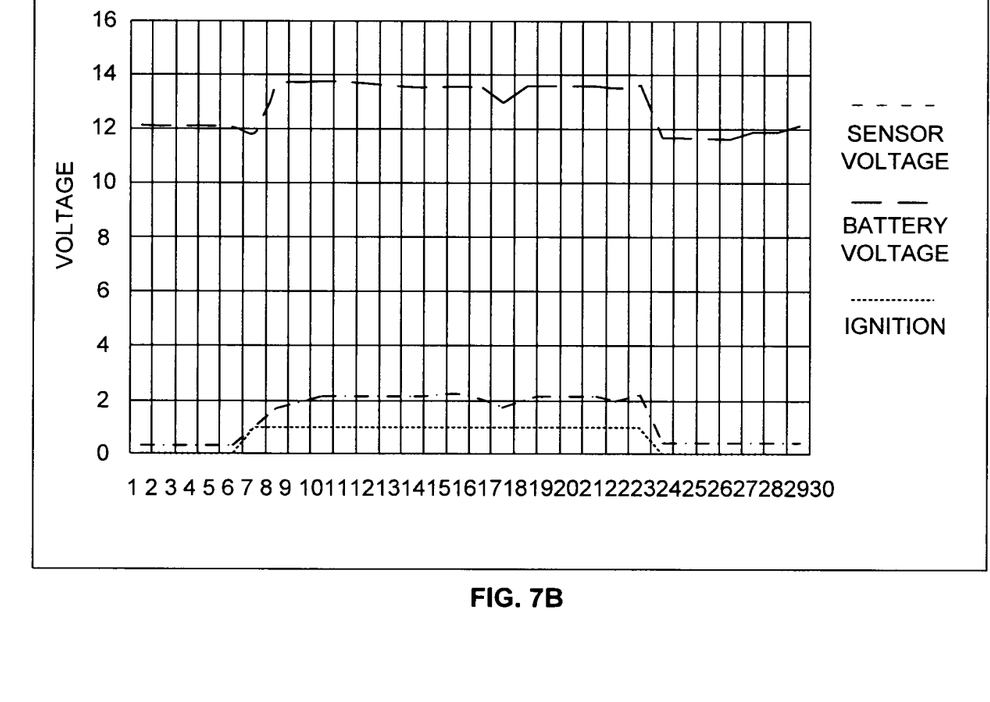
FIG. 7B is a graphical representation illustrating a variation of the sensor voltage with respect to battery voltage and the ignition status of a vehicle over a period of time according to an embodiment herein.

FIG. 7B is a graphical representation illustrating a variation of the battery voltage, the sensor voltage, and the ignition status of a vehicle over a period of time according to an embodiment herein. The sensor voltage, the battery voltage, and ignition status obtained during calibration process are plotted with respect to time. The variations may occur due to internal as well as external factors affecting working of a vehicle or a machine. In one embodiment, external and internal factors may be a sudden acceleration, switching the headlight ON/OFF, or temperature, etc. From the illustration it may be observed that, for the same amount of fuel level, the sensor voltage remain constant when ignition is in OFF condition and varies relative to battery voltage when the ignition is in ON condition. Thus, the graph illustrates that the battery voltage varies significantly even when the ignition is in ON condition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for characterizing a fuel reservoir of a machine, the system comprising:
    a liquid sensor configured to output an indication of a level of a liquid in the fuel reservoir;
    a power unit coupled to the liquid sensor, wherein the power unit is configured to power the liquid sensor at least partly when the machine is in an OFF condition in order for the liquid sensor to generate a plurality of outputs indicative of different levels of the liquid in the fuel reservoir at least partly during refueling of the fuel reservoir; and
    a communication unit configured to communicate with a remote server, the communication unit configured to transmit data, the data being based on the plurality of outputs, generated by the liquid sensor, indicative of the different levels of the liquid in the fuel reservoir at least partly during the refueling of the fuel reservoir; and
    the remote server comprising:
    a calibration unit configured to:
        access a refueling rate indicative of a flow rate of refueling of the fuel reservoir, wherein the refueling rate is constant;
        receive the data;
        determine, using the data and the refueling rate, a mathematical relation between an actual amount of liquid in the fuel reservoir and the level of the liquid;
        after refueling of the fuel reservoir, receive a current level of the liquid in the fuel reservoir;
        determine, based on the current level of the liquid in the fuel reservoir and the mathematical relation, at least one of a need to refuel or fuel pilferage; and
        in response to determining the at least one of a need to refuel or fuel pilferage, perform at least one action.

2. The system of claim 1, wherein the power unit is configured to power the liquid sensor when the machine is in an OFF condition using a battery voltage; and
    wherein the plurality of outputs generated by the liquid sensor when the machine is in an OFF condition are independent of the battery voltage to the machine.

3. The system of claim 1, wherein the power unit comprises a relay unit coupled to the liquid sensor, wherein the relay unit powers the liquid sensor when the machine is in OFF condition in order for the liquid sensor to generate the plurality of outputs at least partly during refueling of the fuel reservoir.

4. The system of claim 1, wherein the calibration unit is configured to determine the mathematical relation between the actual amount of liquid in the fuel reservoir and the level of the liquid by:
    generating a characteristic curve of sensor voltage versus time during refueling of the fuel reservoir.

5. The system of claim 4, wherein the calibration unit is further configured to determine the mathematical relation between the actual amount of liquid in the fuel reservoir and the level of the liquid by:
    using the refueling rate to convert the characteristic curve for the sensor voltage versus time into a characteristic curve for the sensor voltage versus fuel.

6. The system of claim 1, further comprising a sampling unit configured to sample at least one parameter of the machine.

7. The system of claim 6, further comprising an averaging logic unit that is configured to average at least one of the parameters of the machine.

8. A system for characterizing a fuel reservoir of a machine, the system comprises:
    a liquid sensor configured to measure the level of the liquid in the fuel reservoir;
    a relay unit coupled to the liquid sensor, wherein the relay unit is configured to power the liquid sensor at least partly when the machine is in OFF condition in order for the liquid sensor to generate a plurality of outputs regarding different levels of the liquid in the fuel reservoir at least partly during refueling of the fuel reservoir; and a calibration unit configured to:
receive the plurality of outputs regarding the different levels of the liquid in the fuel reservoir at least partly during refueling of the fuel reservoir;
determine, using the plurality of outputs regarding the different levels of the liquid in the fuel reservoir at least partly during refueling of the fuel reservoir and a refueling rate indicative of a flow rate of refueling the fuel reservoir, a mathematical relation between an actual amount of liquid in the fuel reservoir and the level of the liquid in order to characterize the fuel reservoir, wherein the refueling rate is constant;
after refueling of the fuel reservoir, receive a current level of the liquid in the fuel reservoir;
determine, based on the current level of the liquid in the fuel reservoir and the mathematical relation, at least one of a need to refuel or fuel pilferage; and
in response to determining the at least one of a need to refuel or fuel pilferage, perform at least one action.

9. The system of claim 8, wherein a remote server comprises the calibration unit.

10. The system of claim 8, wherein the relay unit is configured to power the liquid sensor when the machine is in an OFF condition using a battery voltage; and
wherein the plurality of outputs generated by the liquid sensor are independent of the battery voltage to the machine.

11. The system of claim 8, wherein the calibration unit is configured to determine the mathematical relation between the actual amount of liquid in the fuel reservoir and the level of the liquid by:
generating a characteristic curve of sensor voltage versus time during refueling of the fuel reservoir.

12. The system of claim 11, wherein the calibration unit is further configured to determine the mathematical relation between the actual amount of liquid in the fuel reservoir and the level of the liquid by:
using the refueling rate to convert the characteristic curve for the sensor voltage versus time into a characteristic curve for the sensor voltage versus fuel.

13. A method of calibrating a liquid level monitoring system for measuring liquid levels in a fuel reservoir of a machine and for analyzing the liquid levels, the method comprising:
accessing a plurality of outputs indicative of different levels of liquid in the fuel reservoir, the plurality of outputs obtained using a liquid sensor at least partly during refueling of the fuel reservoir and when the machine is in the OFF condition;
accessing a liquid injection rate, the liquid injection rate indicative of flow of liquid into the fuel reservoir at least partly during refueling of the fuel reservoir, wherein the liquid injection rate is constant;
determining, using the accessed plurality of outputs and the accessed liquid injection rate in the fuel reservoir at least partly during refueling of the fuel reservoir, a representation between an actual amount of liquid in the fuel reservoir and the liquid level;
after refueling of the fuel reservoir, receiving a current level of the liquid in the fuel reservoir;
determining, based on the current level of the liquid in the fuel reservoir and the representation, at least one of a need to refuel or fuel pilferage; and
in response to determining the at least one of a need to refuel or fuel pilferage, performing at least one action.

14. The method of claim 13, wherein the plurality of outputs obtained using the liquid sensor when the machine is in an OFF condition are independent of battery voltage to the machine.

15. The method of claim 13, wherein determining the representation between an actual amount of liquid in the fuel reservoir and the liquid level comprises:
generating a characteristic curve of sensor voltage of the liquid sensor versus time during refueling of the fuel reservoir.

16. The method of claim 15, wherein determining the representation between an actual amount of liquid in the fuel reservoir and the liquid level further comprises:
using the accessed liquid injection rate to convert the characteristic curve for the sensor voltage versus time into a characteristic curve for the sensor voltage versus fuel.

17. A system for characterizing a fuel reservoir of a machine, the system comprises:
a communication unit configured to communicate with a remote vehicle and to receive a plurality of outputs indicative of different levels of liquid in the fuel reservoir in the remote vehicle, the plurality of outputs obtained using a liquid sensor of the remote vehicle at least partly during refueling of the fuel reservoir and when the remote vehicle is in the OFF condition; and
a calibration unit configured to:
access the plurality of outputs regarding the different levels of the liquid in the fuel reservoir at least partly during refueling of the fuel reservoir;
access a liquid injection rate, the liquid injection rate indicative of flow of liquid into the fuel reservoir at least partly during refueling of the fuel reservoir, wherein the liquid injection rate is constant;
determine, using the accessed plurality of outputs and the accessed liquid injection rate in the fuel reservoir at least partly during refueling of the fuel reservoir, a representation between an actual amount of liquid in the fuel reservoir and the liquid level;
after refueling of the fuel reservoir, receive a current level of the liquid in the fuel reservoir;
determine, based on the current level of the liquid in the fuel reservoir and the representation, at least one of a need to refuel or fuel pilferage; and
in response to determining the at least one of a need to refuel or fuel pilferage, perform at least one action.

18. The system of claim 17, wherein the plurality of outputs obtained using the liquid sensor when the machine is in an OFF condition are independent of battery voltage to the machine.

19. The system of claim 17, wherein the calibration unit is configured to determine the representation between an actual amount of liquid in the fuel reservoir and the liquid level by:
generating a characteristic curve of sensor voltage of the liquid sensor versus time during refueling of the fuel reservoir.

20. The system of claim 19, wherein the calibration unit is further configured to determine the representation between an actual amount of liquid in the fuel reservoir and the liquid level by:
using the accessed liquid injection rate to convert the characteristic curve for the sensor voltage versus time into a characteristic curve for the sensor voltage versus fuel.

* * * * *